United States Patent [19]

Brown et al.

[11] 3,711,859

[45] Jan. 16, 1973

[54] ELECTROGRAPHIC RECORD SYSTEM HAVING A SELF SPACING MEDIUM

[75] Inventors: Arling Dix Brown, Cleveland Heights; John Blumenthal, Wickliffe, both of Ohio

[73] Assignee: Gould Inc., Chicago, Ill.

[22] Filed: May 14, 1970

[21] Appl. No.: 37,209

Related U.S. Application Data

[62] Division of Ser. No. 694,654, Dec. 29, 1967, Pat. No. 3,657,005.

[52] U.S. Cl...346/74 ES, 101/DIG. 13, 250/49.5 GC

[51] Int. Cl...........................G01d 15/06, G03g 5/00

[58] Field of Search............346/74 ES; 101/DIG. 13; 250/49.5 GC, 49.5 ZC

[56] References Cited

UNITED STATES PATENTS 3,500,434 3/1970 Zaphiroponlos et al. .........346/74 ES

*Primary Examiner*—Bernard Konick
*Assistant Examiner*—Gary M. Hoffmann
*Attorney*—Eber J. Hyde

[57] ABSTRACT

There is provided an electrostatic recording system with voltage charging apparatus having charging electrodes and an electrographic record medium having spacer means, a portion of which projects above the outer surface of a dielectric layer of the record medium. The spacer means space the outer surface of the dielectric layer a fixed critical distance from the charging electrodes during the voltage charging operation.

3 Claims, 11 Drawing Figures

INVENTORS
ARLING DIX BROWN JR.
JOHN BLUMENTHAL
BY [signature]
ATTORNEY

ELECTROGRAPHIC RECORD SYSTEM HAVING A SELF SPACING MEDIUM

This application is a division of our application, Ser. No. 694,654, filed Dec. 29, 1967, for an Electrographic Record Medium now U.S. Pat. No. 3,657,005.

BACKGROUND OF THE INVENTION

1. Field of the Invention

This invention relates to an electrographic record system and, more particularly, to the charge retentive surface of the record medium as it is used in a system of high speed electrostatic recording.

In electrostatic recording the indicia to be printed, such as letters, lines, dots, etc., are first formed as invisible electrostatically charged surface areas of an electrographic record medium by means of electrical discharges from suitably shaped and suitably positioned electrodes. The desired size and shape of the charged surface area of the record medium is the size and shape corresponding to an exact reproduction of the charging electrode. The present invention is particularly applicable to an electrographic system using pulse voltage charging to provide a charged area on the surface of the record medium. Subsequently, these charged areas are rendered visible by the application of a toner to the surface of the record medium as a developing agent or "ink." The toner particles are held to the charged areas of the record medium by electrostatic attraction.

Voltage charging is herein defined as the electrical charging of an area (as defined by the charging electrode) of the dielectric surface of the record medium by momentarily raising the electrical potential of the charging electrode with respect to a conductive stratum of the record medium during a period of relatively no displacement between the electrode and the surface to be charged. Thus, the electrical charging potential may be of any time duration as long as there is essentially no relative displacement between the charging electrode and the record medium. This is in contrast to d-c charging where the electrical potential remains on the charging member during a period of relative displacement (perpendicular or lateral) between the latter and the record medium. This definition is to distinguish the most useful application of the present invention, i.e., pulse voltage charging type of electrostatic recording, from d-c writing.

2. Description of the Prior Art

In establishing electrically charged areas on a record medium with pulse voltage charging, it is well known in the art that a gap or space must exist between the charging electrode and the surface of the record medium to be charged. If the charging electrode is in intimate contact with the surface, and no displacement between the two occurs in the period during which the pulse voltage is applied, the potential on the dielectric surface of the record medium will follow the potential on the charging member. That is, the area actually contacted by the charging electrode will return to zero potential along with the electrode resulting in no remanent electrical charge on the record medium.

In practice it is extremely difficult to provide true electrical contact between the contacting surface area of the charging electrode and the corresponding area on the dielectric surface. The existence of some minute gap, even though infinitesimal, may generally be assumed for most of the area involved. For this reason, the charging of the surface area involves transporting a net electrical charge across a gaseous medium, generally air at atmospheric pressure and at room temperature for practical charging arrangements. The nonlinear electrical conduction in gases causes the charges transported to the surface of the dielectric layer of the record medium to become trapped thereon, rather than being drained off again through the charging electrode, as would be the case if true contact to the dielectric layer had been established.

As a result of knowing a gap must exist, many different approaches have been taken in the prior art to create the gap, and different opinions and theories have been expressed as to length of the gap. In all cases, the magnitude of the gap is extremely small, on the order of thousandths of an inch and less.

At this point it is felt to be necessary to discuss the effect of varying the gap length on the voltage required to charge a defined surface area. This will show the critical nature of having the proper gap length and thereby demonstrate the necessity for providing proper gap spacing. This can best be seen by a general description of the results observed from experimentation since the theoretical explanations of the prior art appear to be contradictory. When operating at atmospheric pressure and with extremely small gap distances, less than 0.2 mil, the voltage required to produce charging of the surface of the dielectric layer increases rapidly as the gap length is decreased. The required voltage increases so rapidly that for gap lengths of about 0.04 mil and less, the charging becomes virtually impossible for any practical system. If the gap length is increased from about 0.25 mil, the voltage required for charging also increases but at a more gradual rate than when the gap length is decreased below 0.2 mil. Increasing the gap length above about 0.25 mil does not result in exorbitantly high voltages but does result in substantially higher required voltages and in harmful side effects, mainly, spreading and loss of resolution of the electrostatic latent image on the surface of the record medium.

The prior art teaches that a gap length in the order of 0.1 mil to 0.25 mil or larger is preferable. Generally speaking, the prior art has tried to create a gap length in this range by having the record medium supported in a parallel planar relationship with the charging electrodes. In most cases, the record medium rests on the inner surface of a lower supporting means. The interior of the upper means, which carries the charging electrodes, is spaced out of contact with the record medium. Such a method is severely limited by incremental thickness variations in the vicinity of the charging electrode; and also may be severely limited by gross sheet thickness variations across the entire width of the record medium. In addition, it is difficult and expensive to make a charging head several inches in length with a uniform tolerance within about 1 mil. It should be remembered that the magnitudes when discussing the gap length are extremely small and that to hold paper tolerances to such limits would be very expensive. In order to achieve the precise gap spacing taught by the present invention, the prior art paper and/or equipment tolerances would have to be in the order of tenths of a mil.

Another major factor is the time duration of the pulse applied to the charging electrode. Increasing the magnitude of the applied voltage will improve reliability. However, care must be taken not to transfer excessive charge to the charging electrode since the charge spreads laterally at the record surface. On development, this spreading of charge manifests itself in image deformities.

The present invention provides a record medium which is reliably charged by conventional charging apparatus with pulses as low in voltage as about 450 V. and durations at least as short as 0.5 microsecond.

It should be noted, however, that the discharge is not solely influenced by the gap length and pulse time duration but also by several other conditions, including humidity and pressure of the ambient atmosphere.

An object of the present invention is to provide, in an electrostatic recording system with voltage charging, a novel solution to the gap spacing problem in that the charging electrodes are spaced from the surface of the record medium to be charged by the record medium itself. Thus, the desired spacing is obtained without external components.

A further object of the present invention is to provide an electrographic recording system which eliminates the need for any external adjustment of the charging electrodes or the record medium to obtain the desired gap spacing.

Another object of the present invention is to provide an electrographic recording system having a record medium which, when in contact with the charging head, has at least 80 percent or greater of the dielectric surface at or nearly at the desired critical spacing.

A further object of the present invention is to provide an electrographic recording system which automatically provides proper spacing between the charging head and the medium.

SUMMARY OF THE INVENTION

Briefly, in accordance with the present invention, for use in electrostatic recording with voltage charging apparatus, the electrographic record medium, having a dielectric layer with an outer surface capable of retaining an electrostatic charge, is provided with spacer means projecting above the surface of the dielectric layer for cooperating with the recording head to establish a given space therebetween.

The invention will be better understood from the following description of a preferred embodiment to be read in conjunction with the accompanying drawing, and the features believed to be novel will be more particularly pointed out in the appended claims.

DESCRIPTION OF THE PREFERRED EMBODIMENT

Figure 1:
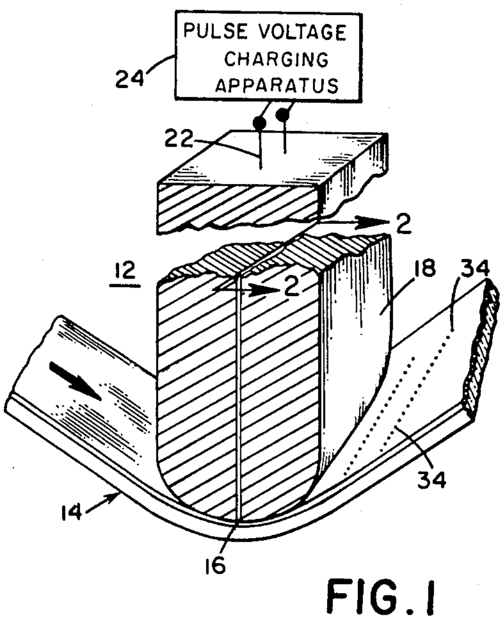
FIG. 1 is a side elevation of an electrostatic charging head in contact with the electrographic record medium of the present invention.

Referring to FIG. 1 of the drawing, a conventional voltage charging system having a charging head 12 is shown in contact with a moving electrographic record medium 14 which is transported by means (not shown). The charging head 12 comprises an array of fine charging electrodes or styli 16 (see FIG. 2). The charging electrodes 16 are generally small, fragile electrical conductors; by way of illustration, the charging electrodes 16 of this present embodiment are approximately 8 mils in diameter and spaced on 10 mil centers. Therefore, they are generally embedded, as in this embodiment, in support 18 preferably composed of a suitable insulating material such as a plastic or ceramic insulator. If stronger electrodes 16 are used, no support is necessary.

In the present embodiment, the charging electrodes 16 are arranged in a linear array (see FIG. 2) for line-type printing; however, the present invention would work equally as well with any arrangement of the charging electrodes 16, for example, a matrix display.

Figure 2:
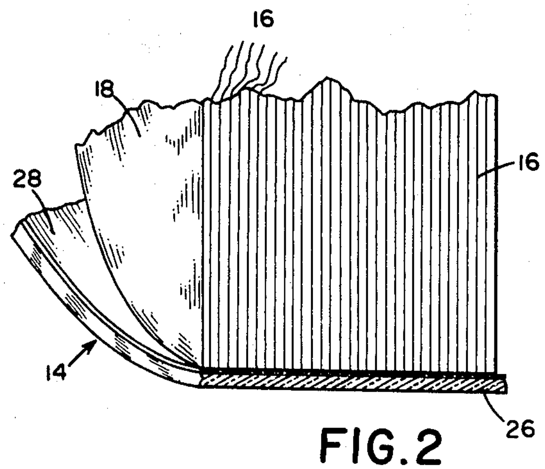
FIG. 2 is a cross-sectional view along line 2—2 of the electrostatic charging head of FIG. 1 showing the linear array of charging electrodes.
Figure 3:
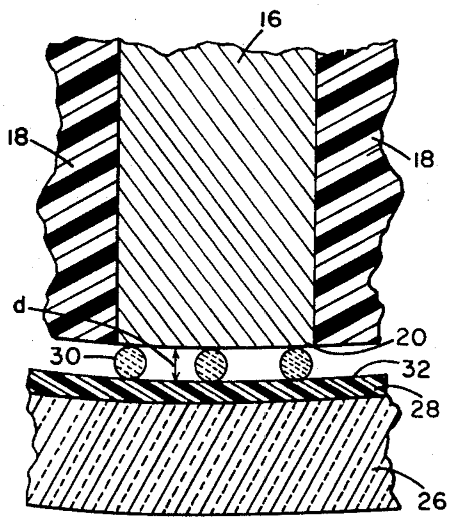
FIG. 3 is an enlarged and sectioned side view of FIG. 1 showing the relationship of one charging electrode to the record medium of the present invention.

As shown in FIGS. 2 and 3, the charging electrodes 16 are flush with the insulating support 18 at their lower exposed ends 20. Lower exposed ends 20 of the charging electrodes 16 define the electrostatic latent image that results on the record medium and can be of any shape such as letters, lines, dots, etc., to produce a similar latent image on the electrographic record medium 14. The shape of the lower exposed ends 20 of the present embodiment is, for example, a circular area or dot.

The upper ends 22 of the charging electrodes 16, as shown in FIG. 1, are connected to a pulse voltage charging apparatus 24. Apparatus 24 receives electrical signals from a computer or any other high speed electronic pulse creating device and transfers the signals to the proper electrodes.

In the present embodiment, the record medium 14 comprises a conductive base layer 26, a dielectric top layer 28 and spacer means 30 (see FIG. 3). The conductive base layer 26 is preferably a conventional conductive paper, such as those obtained by coating and/or impregnating with various ionic conductors as used in the art, conductive carbon filled paper or carbon filled coatings on paper. The dielectric layer 28 is preferably a conventional dielectric lacquer coating as used in the art, for example, a polyvinyl acetate, polystyrene, polyvinyl butyral, or polymethyl methacrylate. It is desirable for keeping the applied voltage at a minimum that the dielectric layer be kept as thin as possible in range of 0.1 to 0.3 mils.

In accordance with the present invention and as shown in FIG. 3, a spacing or gap, of length *d*, between the lower exposed ends 20 of the charging electrodes 16 and the record medium 14 is provided by the medium, and more particularly by spacer means 30. The spacer means 30 can be granular particles of a size that will result in projections above the surface of the dielectric layer to provide the desired spacing, length *d*. Examples of such spacer means 30 which can be dispersed in the dielectric lacquer are preferably cornstarch, glass shot, refractory particles, or any other particles which when dispersed in or on the dielectric layer 28 provide the required spacing. In an alternative method, the spacing may be provided by altering the surface of the dielectric layer itself to provide the spacer means or by printing the spacer means on the surface. Whether the spacer means may be conductive depends on their relationship to the conductive layer. This aspect of the invention will be explained when discussing the various species of the present invention.

In the charging step of the electrostatic recording process (see FIG. 1), a pulse of electrical energy from the pulse charging voltage supply 24 is applied to the upper ends 22 of charging electrodes 16. This causes a pulse to be applied to the lower ends 20 of charging electrodes 16; thus, a potential is created between the electrodes 16 and the conductive layer 26 which causes a potential across the dielectric layer 28 and gap, of length *d*. A discharge occurs leaving the surface 32 of the dielectric layer 28 with a charged area 34 preferably corresponding to an exact reproduction in size and shape of the lower exposed end 20 of an electrode 16. During the time the discharge occurs, there is substantially no relative displacement of the charging electrode and the record medium; hence, the defined pulse voltage charging of the surface of the dielectric layer occurs.

Figure 4:
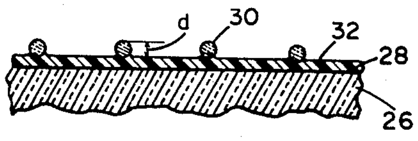
FIGS. 4 through 7 illustrate five species of spacer means in the present invention.
Figure 5:
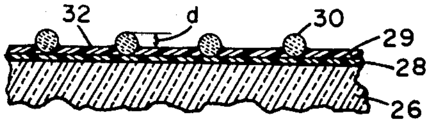
Figure 6:
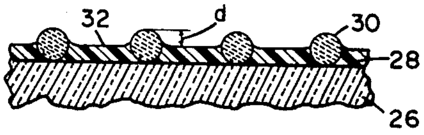
Figure 7:
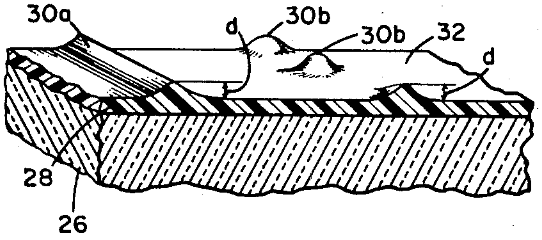

As previously mentioned and in accordance with the present invention, the gap, of length d, is created by the projection of the spacer means 30 above the surface 32 of dielectric layer 28. In accomplishing this result by granular particles, the spacer means 30 may be located in three different relationships to the dielectric layer 28 as shown in FIGS. 4 through 6. In addition, the spacer means 30 may also be provided by uniform alteration of the texture of the surface 32 of the dielectric layer 28 by embossing or printing techniques as shown in FIG. 7. In all of these embodiments the essential requirement is that the spacer means 30 project above the surface 32 of dielectric layer 28 from 0.05 mil to 0.4 mil, and preferably 0.2 to 0.25 mil, to result in a gap, of length *d*.

In the embodiment in FIG. 4, the spacer means 30 reside on the surface 32 of the dielectric layer 28 in which case the particle size of the spacer means 30 would be in the range of about 0.05 to 0.4 mil to provide the requisite gap, of length *d*. In this embodiment the spacer means 30 can either be non-conductive or conductive particles. In a method of making this embodiment, the particles could be coated onto the dielectric layer out of a dispersion in a liquid which renders the surface tacky so that the particles become adhered. The particles could also be secured thereto by fusing with heat when either the dielectric layer or the particles or both are heat fusible. Suitable particulate or granular materials for this purpose are glass shot, polyethylene, crude hard wax emulsion, or a metal powder, for example, aluminum powder or zinc dust.

In the embodiment in FIG. 5, the spacer means 30 are fixed to the dielectric layer 28 but do not contact the conductive layer 26. In this case, the particle size of the spacer means 30 would be dependent on the depth to which they are situated in the dielectric layer 28. However, the dielectric layer 28 itself is limited in practical thickness 0.1 to 0.4 mil. However, the projection of the spacer means above the surface 32 of dielectric layer 28 is still in the range of about 0.05 to 0.4 mil. A method of making this embodiment of the present invention is to disperse conductive particles in a second dielectric layer 29. This second dielectric material 29 is then spread over a conductive layer 26 which already has a thin dielectric layer 28 to insulate the conductive particles of the top dielectric layer 29 from the conductive base layer. In this case, the spacer means 30 can also be either conductive or non-conductive since they are not in contact with the conductive layer 26.

In the embodiment shown in FIG. 6, the spacer means 30 are particles embedded in the dielectric layer 28 and are in contact with the conductive layer 26; hence, in this case, the spacer means 30 must be a dielectric material to prevent a direct electrical path to the Conductive layer 26. The particle size of the spacer means 30 would be dependent on the thickness of the dielectric layer; however, the projection of the spacer means 30 above the surface 32 is still from 0.05 to 0.40 mil. This is the preferred embodiment since the spacer means 30 can be mixed with the dielectric coating lacquer and deposited on the conductive layer 26. The method of making an electrograph record medium in such a manner is fully discussed later in this specification.

As shown in FIG. 7, alternate species of the spacer means 30 of this present invention can be provided by altering the surface 32 of the dielectric layer 28 or by printing the spacer means on the surface. In altering the surface as shown in spacer means **30–*a*, the dielectric layer 28 can be raised by an embossing process to form uniform ridges which project from 0.05 to 0.40 mil above the surface 32 of the dielectric layer 28. As shown in spacer means 30–*b*, the gap, of length d, can be provided by printing the means 30–*b* on the surface 32 of the dielectric layer 28. This can be done by conventional printing techniques such as gravure or intaglio printing. In all cases, the printed marks project from 0.05 to 0.4 mil and preferably 0.2 to 0.25 mil above the surface 32 of the dielectric layer 28**.

An expedient method of creating a controlled texture is to disperse 0.4 mil diameter spherical particles in the plastic coating lacquer used in preparing the paper. Typically, the dry thickness of the plastic coating is around 0.2 mil. As lacquers tend to flow away from sharp edges or points, the peaks of the embedded spacer means 30 remain essentially free of dielectric material 28, thus forming 0.2 mil projections above the surface 32 of the dielectric 28 material. In an actual laboratory made coating cornstarch was used as the spacer means 30. The natural size distribution fell between 0.25 mil and 0.5 mil with a preponderance measuring about 0.4 mil. The dielectric coating had the following components:

| | |
|---|---|
| 100g. | polyvinyl acetate |
| 20g. | oil soluble phenolic resin |
| 150g. | rutile - $TiO_2$ |
| 400ml. | methyl ethyl ketone |
| 2.0g. | cornstarch |

In this formula the coloring pigment ($TiO_2$) is used to impart whiteness to naturally black carbon filled paper.

The dielectric coating so prepared was applied to a conventional carbon filled paper by a No. 15 Myer rod and resulted in dry film having a thickness of 0.2 mil with starch particles projecting about 0.2 mil above the surface and having a distribution of about 4 particles per 100 sq. mils of area. This is approximately 96 percent or better of free surface spaced a controlled distance from the charging electrodes.

The relative ease with which this electrographic record medium was made indicates that volume production would be economical, and that standard coating techniques can be employed in its manufacture. The low use level of spacing material should make it an insignificant cost factor.

Figure 8:
FIGS. 8 and 9 are actual photographs of finished records under magnification and made without the spacing means as taught by the present invention.
Figure 9:
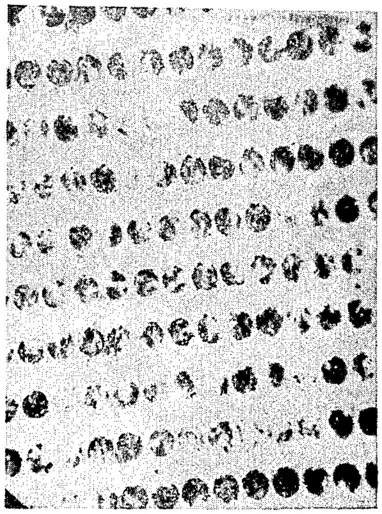
Figure 10:
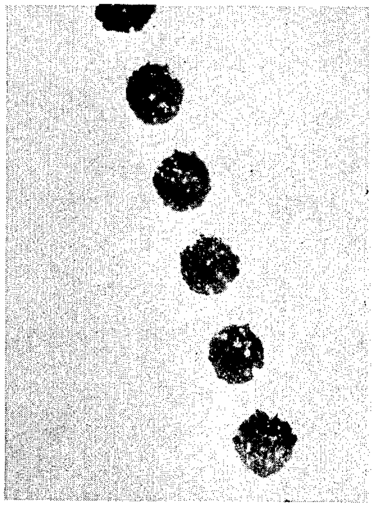
FIGS. 10 and 11 are actual photographs of finished records under magnification and made under the exact same conditions as the records in FIGS. 7 and 8 but using a record medium embodying the present invention.

FIGS. 8 through 10 illustrate the comparative testing of an electrographic record medium of the present invention, made as described above, and a control medium, i.e., an electrographic record medium not using spacer means. The record medium in both cases was passed over a conventional charging head as shown in FIG. 1 which had approximately 8 mil diameter charging electrodes spaced about 1.5 mil apart. Pulses of 550 volts and of 1 second duration were applied to the charging electrodes. The air in the vicinity of the charging head was humidified to about 80 percent relative humidity. After the charged areas 34 (see FIG. 1) were formed on the record mediums, the record mediums were toned by identical toning methods. In these particular tests, the toning was done by means of a liquid toner for highest resolution; however, the toning process could have been a dry toner as the results of the testing rely mainly on the adequate charging of the surface 32 rather than on the toning methods used.

The results of these tests are quite visibly apparent as illustrated by the photographs in FIGS. 8–10. These photographs were taken while the record mediums were under magnification to more clearly show the resulting printed marks 36. If these printed marks were viewed with the naked eye, they would appear about as large as a dot made by a sharp pencil (about 8.0 mil diameter). FIGS. 8 and 9 illustrate the resulting marks on the control electrographic record medium, i.e., having no spacer means. In FIG. 8 the record medium was passed over the head with only one charging electrode operating. FIG. 9 is the result of a whole line of charging electrodes being pulsed simultaneously. As is quite apparent, reliability and resolution were low. Some of the toned marks as at 37 are completely obliterated and represent the fact that a sufficient charge was not placed on the surface of the record medium to cause the attraction and retention of toner particles.

Figure 11:
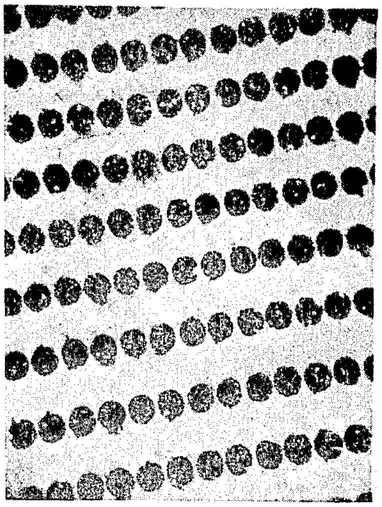

FIGS. 10 and 11 represent the results using the electrographic record medium of the present invention. The results are conclusive: improved reliability and almost completely uniform printed marks 36 were achieved. The marks 36 contain nearly uniform depth of tone over their entire area with the exception of four to seven light flecks 38 per mark (see FIGS. 10 and 11), each about 0.5 mil in diameter. These flecks 38 almost invariably identify the high spots created by the embedded starch particles. Their effect to the total area of the mark 36, however, is negligible.

It will be understood by those skilled in the art that the foregoing and other changes in the form and details may be made therein without departing from the spirit and scope of the invention. In view of the many species suggested, there are an unending number of ways to provide the spacing means 30 of proper size and distribution. Also, if the other factors (other than gap length) which are variables to be considered in surface charging are drastically changed from the generally normal conditions stated herein, there would be a corresponding change in the requirements on the spacer means 30.

What we claim as new and desire to secure by Letters Patent of the United States is:

1. In an electrostatic printing operation, a voltage charging system comprising:

a charging head having a multiplicity of charging electrode means embedded in an insulator body, said charging electrode means connected at one end to voltage charging apparatus and the other end exposed to dissipate said electrical energy;

a record medium having a conductive layer, and a dielectric layer, said dielectric layer having an outer surface exposed to said other exposed end of said charging electrodes, said outer surface capable of receiving and retaining an electrostatic charge;

spacer means on said outer surface of said dielectric layer, said spacer means projecting above said outer surface of said dielectric layer for establishing a given space between the said outer surface of said dielectric layer and said charging electrode means during a recording operation;

a voltage charge applied by said voltage charging apparatus to said charging electrodes resulting in a charged area of said outer surface of said dielectric layer.

2. An electrostatic charging system comprising, in combination:

voltage generating means;

a charging head having a multiplicity of charging electrode means embedded in an insulator body with one end of each said electrode means exposed;

means connecting the opposite end of each of said electrode means to said voltage generating means;

a record medium having a conductive layer and a dielectric layer, said dielectric layer having an outer surface;

spacer means affixed to said dielectric layer and projecting above the surface thereof for establishing a given space between the outer surface of said dielectric layer and the exposed ends of said electrode means while said spacer means are in contact with said charging head during a recording operation.

3. An electrostatic charging system as set forth in claim 2, further characterized by said spacer means spacing said dielectric layer from the exposed ends of said electrode means by a distance of from 0.05 to 0.4 mils.

* * * * *